UNITED STATES PATENT OFFICE 2,228,268

CYCLIC ACYLOINS AND PROCESS FOR PRODUCING THEM

Virgil Leland Hansley, Niagara Falls, N. Y., assignor to E. I. du Pont de Nemours & Company, Wilmington, Del., a corporation of Delaware No Drawing. Application August 17, 1938, Serial No. 225,443

12 Claims. (Cl. 260—586)

This invention relates to acyloins of polycarboxylic acids and to processes for preparing the same.

This invention has as an object the preparation of new compositions of matter. A further object is the preparation of new materials for use in the perfume industry. Another object is the preparation of materials useful as synthetic waxes. A still further object is the preparation of intermediates for resinous products. Other objects will appear hereinafter.

These objects are accomplished by the following invention wherein a neutral monohydric alcohol ester of an open chain dicarboxylic acid having a radical length (as defined below) of at least seven is condensed with itself by means of an alkali metal, particularly sodium, in the presence of an inert solvent to form acyloins of the dicarboxylic acid. The condensation may be intramolecular, resulting in a cyclic acyloin, or it may be intermolecular, resulting in the formation of linear polymeric acyloins. In either case, alkali metal alcoholate is eliminated, the probable mechanism being as follows:

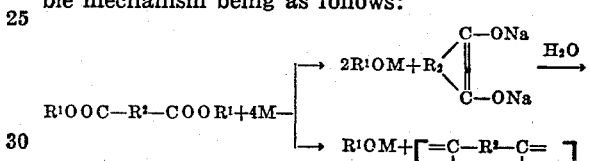

In the above, $R^1$ is the radical of a monohydric alcohol, $R^2$ the residue from the dicarboxylic acid, M an alkali metal, and $x$ the number of recurring units in the polymer. It is possible that the final products are in equilibrium with their tautomeric forms, that for the cyclic acyloin being, for example,

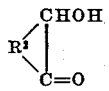

Both cyclic and polymeric acyloins are generally formed, the relative amounts of each varying with conditions, as is more fully explained below.

The term "radical length" refers to the length of the chain between and including the carboxyl carbons of the dicarboxylic acid.

In the process of the present invention a neutral monohydric alcohol ester of an acyclic dicarboxylic acid having a radical length of at least seven is condensed with itself by heating with sodium or other alkali metal while agitating efficiently, and the acyloins that are formed then separated. The self-condensation is conveniently effected by adding the ester, e. g., diethyl sebacate, to a suspension in an inert solvent, e. g. xylene, of the alkali metal which has previously been dispersed in a colloid mill at a temperature above the melting point of the alkali metal, e. g. at 100° C. when sodium is used. The ester is added slowly, i. e., over a period of one to two hours, and the reaction mixture is then agitated for several (six to ten) hours, e. g. by passage through a colloid mill, the temperature preferably being maintained throughout above the melting point of the alkali metal. The reaction is in general continued until the mixture is too viscous to stir or pump. The acyloin materials are then isolated. For this purpose, a lower aliphatic alcohol, e. g. methanol, is added to destroy any unreacted alkali metal, and the several alcoholates present are then converted to alcohols by the addition of a large volume of water or aqueous acid. The layers are separated, and any insoluble material is removed by filtration. The solvent layer is evaporated under reduced pressure, and the residue is fractionally distilled under high vacuo. The product will be a mixture of cyclic acyloin and linear polyacyloins of various degrees of polymerization, the relative amounts of cyclic and polyacyloins varying with reaction conditions. The cyclic acyloins and the lowly condensed polyacyloins are volatile and can be separated from each other and from the substantially non-volatile relatively highly condensed residue by heating in a high vacuum.

The principal factor influencing the type of product formed is the ratio of solvent to ester reactants. The more dilute the solution of ester, the greater will be the proportion of cyclic acyloin. It is usually, however, not possible to obtain one type of product to the exclusion of the other, and when the pure cyclic acyloin is desired, it must be isolated, as noted above, by fractional distillation in a high vacuum.

The more detailed practice of the invention is illustrated by the following examples, wherein parts given are by weight. There are of course many forms of the invention other than these specific embodiments.

Example I

Forty-six (46) parts (2 mols) of sodium is dispersed in 520 parts of hot xylene by the use of a colloid mill. One hundred twenty-nine (129) parts (½ mol) of diethyl sebacate in 520 parts of xylene is added dropwise over a period of from 1 to 2 hours, after which the mill is run for an additional six hours at 110° C. The mixture is then cooled to 20° C. and 64 parts (2 mols) of methanol introduced to destroy any excess sodium. The mixture is next made acid to litmus with 35% aqueous sulfuric acid, after which the xylene solution is separated by filtration from the sodium sulfate decahydrate which has formed. The xylene solution is then dried over calcium chloride and subjected to fractionation in vacuo. After removal of xylene, the cyclic acyloin is obtained as a yellow oil boiling at 130° C./5 mm. It has a pronounced camphoraceous odor and a refractive index, $$N_D^{25}$$

of 1.4900. The carbon and hydrogen contents were found on analysis to be 70.80% and 10.40% respectively, whereas the amounts calculated for a compound of the formula $C_{10}H_{18}O_2$ are 70.53% and 10.66%. The non-volatile residue (about 60 parts) is a yellow waxy solid and is composed of a mixture of polymeric acyloins of varying molecular weights.

Example II

In this exemplification of the invention an excess of sodium is used. Sixty-nine (69) parts (3 mols) of sodium and 600 parts of xylene are milled for 20 minutes at 140° C. in a colloid mill. One hundred fifty-seven (157) parts (½ mol) of dibutyl sebacate in 520 parts xylene is added fairly rapidly. The reaction mixture is circulated through the mill for a total of 10 hours at a temperature of 125–140° C. At the end of this time, the excess sodium is destroyed with methanol, and the product extracted with water. The water extract is discarded and the residue filtered to remove the insoluble portion. This water and xylene-insoluble portion is extracted with butyl acetate, some 8–9 parts (representing a yield of 10%) being dissolved. This butyl acetate-soluble polymeric acyloin had a molecular weight of 869. The remaining water and butyl acetate-insoluble portion is a polyacyloin of somewhat higher molecular weight and amounted to about 38 parts (representing a yield of 45%). It is insoluble in all or nearly all common organic solvents. The xylene-soluble fraction remaining from the original water extraction is subjected to distillation under vacuum. The xylene distills first and is followed by about 2 parts of the cyclic acyloin, boiling 130°C./6 mm. The residue is a lowly polymeric polyacyloin, of molecular weight 575 in benzene, and amounts to about 18 parts, or a yield of 21%.

The above examples illustrate the preparation of acyloins composed chiefly of polymeric acyloins. The following example, in which the dilution is greater, shows preparation of acyloins containing a higher percentage of cyclic acyloin. This example also shows use of an ester of another dicarboxylic acid.

Example III

Seven (7) parts of sodium is dispersed in 350 parts of xylene in a colloid mill at 110° C. Twenty-five (25) parts of the dimethyl ester of hexadecamethylene-dicarboxylic acid is dissolved in 520 parts of xylene and added dropwise to the sodium dispersion, after which the reactants are circulated through the colloid mill for an additional 6 hours at 110° C. At the end of this period, ethanol is added to destroy any unreacted sodium, and the xylene solution is then extracted with water. After the solution has been dried over calcium chloride and the xylene removed under diminished pressure, the residue is subjected to fractional distillation. A 44% yield of the monomeric cyclic acyloin boiling at 214–220° C./6 mm. is obtained. This product is a yellow wax having a pronounced camphoraceous odor. It was found to have a molecular weight of 278, a carbon content of 76.36%, and a hydrogen content of 11.85%. The values calculated for a product of the formula $C_{18}H_{34}O_2$ are 282, 76.52%, and 12.14%, respectively.

The following exemplification of the invention indicates the quantitative relationships between the various products under the conditions stated.

Example IV

Forty-six (46) parts (2 mols) of sodium is emulsified in 1300 parts of xylene to which is added slowly 115 parts (0.5 mol) of dimethyl sebacate dissolved in 1300 parts of xylene, the temperature being maintained at about 105° C. and a colloid mill being used to prepare the emulsion and to serve as agitator. After stirring for an additional ½ hour at 105° C. and allowing to stand over night the mixture is neutralized at 0° C. with 9N sulfuric acid.

By this procedure there are obtained degrees of polymerization from the simplest ring compound possible,

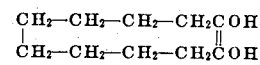

to polymers too high in molecular weight to be soluble in hot xylene. The results expressed in percentages are shown below:

| Fraction | Description | Yield |
|---|---|---|
| 1 | Rubber-like material insoluble in ordinary organic solvents | Percent 6.9 |
| 2 | Rubber-like material insoluble in xylene but soluble in acetone | 9.7 |
| 3 | Rubber-like material soluble in xylene, acetone or a mixture of equal parts of acetone and alcohol | 32.2 |
| 4 | Sticky, very viscous liquid of average mol. wt. (boiling acetone) 450–500; soluble in xylene, acetone, alcohol and the like | 21.4 |
| 5 | Liquid product, B. P. 130–5° C./20 mm | 6.4 |
| 6 | Water soluble products and mechanical loss | 23.4 |

Fraction #5 is the cyclic acyloin. It was found on analysis to have a molecular weight of 168, whereas the calculated value for a compound of the formula

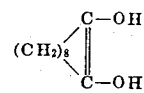

or of its tautomer

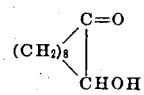

is 170. Fractions 1, 2, and 3 are polyacyloins and Fraction 4 a mixture of cyclic and polyacyloins. The polyacyloins are believed to be made up of recurring structural units

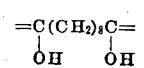

linked one to another by ethylenic double bonds, thus:

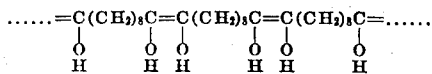

The cyclic and polyacyloins from other dicarboxylic acids of radical length at least 7 can be formulated similarly. As already indicated, the cyclic acyloins can be expressed comprehensively as

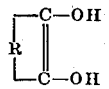

or

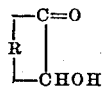

or an equilibrium mixture of the two, R being a divalent radical having at least 5 annular atoms. The polyacyloins can be said to be composed generally of recurring units

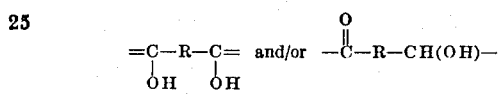

R being a divalent radical having at least 5 carbon atoms in a straight chain.

The invention is generic to the condensation of neutral monohydric alcohol esters of open chain dicarboxylic acids having a radical length of at least seven. While any monohydric alcohol neutral ester may be employed, the use of any but those of the lower aliphatic alcohols ($C_1$–$C_5$ inclusive) introduces so many possibilities of difficulties and complications that in practice only the latter will be used, i. e., the methyl, allyl, ethyl, propyl, butyl, and amyl esters. However, the phenyl, cyclohexyl, n-octyl, etc esters may also be used.

The above-noted esters may be those of any saturated or unsaturated open chain dicarboxylic acid having a radical length of at least seven. Saturated acids, however, are generally preferred since they are more readily available. Acids whose esters are suitable include: sebacic, hexadecamethylenedicarboxylic, pimelic, suberic, azelaic, brassylic, tetradecamethylenedicarboxylic, dodecamethylenedicarboxylic, tridecamethylenedicarboxylic, $\gamma$-ethoxypimelic, $\gamma$-ketopimelic, and 4-methyl-2-amylene-1,5-dicarboxylic. Acids which have radical lengths of 14 to 16 inclusive yield cyclic acyloins of most interest in the perfume field, their odors being more pleasant and persistent.

While any alkali metal may be used in the condensation, including lithium, sodium, and potassium, the preferred metal because of availability, cost per pound and cost per atomic weight, is sodium. Generally, chemical equivalents of sodium and ester are used but an excess of one or the other may be employed. For best results and suppression of by-product formation, the ester is added gradually thereby insuring the presence of a large excess of alkali metal, e. g., sodium, throughout the reaction. This substantially (cf. Organic Syntheses, vol. XVII, page 30, (1937)) prevents Claisen condensation. The use of four atomic proportions of sodium is exemplary of this detail. Alkaline earth and polyvalent metals generally should be avoided because of difficulty in hydrolysis and other complications.

Any inert solvent, i. e. a solvent for the ester employed which is inert toward reactants and products, may be used. Its boiling point at the pressure employed in the condensation should preferably be above the melting point of the alkali metal used. This is desirable because of the advantage of employing a fine dispersion of molten alkali metal. Because of the high melting point of lithium, suitable solvents are limited, although such compounds as durene, prehnitol, triethylbenzene may be employed; however, these solvents introduce difficulties in isolating the products. When potassium, caesium or rubidium are used, solvents boiling as low as benzene, cyclohexane or n-hexane may be employed. For convenience when sodium is used as the condensing alkali metal, as is preferred, xylene is the best solvent because of the convenience of its boiling point.

The condensation may be carried out at any convenient temperature ranging from that at which reaction begins to be perceptible, usually 25–30° C., up to any temperature short of thermal decomposition of reactants or products, usually about 200° C. Preferably the temperature should be above the melting point of the alkali metal used (i. e. above 97° C. with sodium and above 62° C. with potassium) in order that reaction will proceed at a practical rate and in order that the mixture may be more readily agitated; for example, such temperatures are almost necessary when a colloid mill is used. The reaction may be carried out under pressure if it is desired to operate above the atmospheric boiling point of the solvent chosen. In practice the temperature during the addition of alcohol and/or acid will be kept below about 35° C. though higher temperatures are not seriously harmful.

In the present process, efficient agitation is highly desirable and practically necessary. Thorough agitation may be effected in a number of ways, e. g. turbulent flow pipe line mixing, high speed stirrers, and the like; however, a colloid mill is preferred because of the completeness of the mixing.

The concentration of the ester in the solvent may be varied over wide limits. The quantity of solvent used will also depend on type of product desired, high dilution, as already explained, favoring cyclization. Also, the solvent should be present in amount sufficient that the final reaction mixture, though viscous, may still be stirred. Thus, in Example I, the product from 129 parts of ethyl sebacate is contained in 1040 parts of xylene, and the mixture, though very viscous, could still be stirred though with difficulty. With proper adjustment of other factors, the concentration may vary from 2 to 40%. The higher concentrations, however, should be avoided when cyclic acyloins are desired, or when very highly polymeric polyacyloins are to be prepared. In general, considerations of economy dictate that the amount of solvent used be as low as is consistent with ease of operation and formation of type of product sought.

The amount of alcohol used should be at least that theoretically required for reacting with all the alkali metal originally used. Any desired excess may be employed though there is no particular advantage in a large excess. The amount of water used in the washing step may be any convenient quantity that will remove all the alkali effectively. If aqueous acid is used instead, the amount will desirably, though not necessarily, be sufficient to neutralize the alkali present and may be used in excess though there is no particular advantage in so doing. The concentration of the acid is preferably low but is not critical.

The products of the present invention are generically new. They are acyloins of open chain dicarboxylic acids having a radical length of at least seven. They are characterized by the presence of a —CHOH—CO— group (or its tautomer —COH=COH—) attached by at least one of its valences to a bivalent open-chain, aliphatic, radical having a chain length between its valences, of at least five.

The cyclic acyloins have the remaining valence of the —CHOH—CO— group attached to the remaining valence of the same bivalent, open-chain, aliphatic radical. The invention includes all such cyclic acyloins and therefore the cyclic acyloins from any open-chain saturated or unsaturated dicarboxylic acid including those named above.

The polyacyloins have the remaining valence of the —CHOH—CO— group attached to another representative of the same bivalent open chain aliphatic radical. The invention is likewise generic to all these polyacyloins and therefore to the polyacyloins of any open chain saturated or unsaturated dicarboxylic acid including those named above. The invention is likewise generic to the subgenera wherein the joining radical R is saturated hydrocarbon and preferably polymethylene.

The polymeric acyloins of the present invention are of use as synthetic waxes and synthetic rubbers. The cyclic acyloins are of use in perfume compositions. Both the cyclic and polyacyloins may be used as intermediates for the preparation of other chemical products. When hydrogenated at 75–150° C. and at pressures of 20–300 atmospheres, in the presence of an inert solvent and of a hydrogenation catalyst such as finely divided nickel, the cyclic and polyacyloins are converted respectively to saturated cyclic and polymeric glycols. The former are of use in perfume compositions and the latter as intermediates for alkyd and polyacetal resins. The saturated polymeric glycols are claimed in Coffman and Faris, Serial No. 225,442, filed of even date herewith.

The above description and examples are intended to be illustrative only. Any modification of or variation therefrom which conforms to the spirit of the invention is intended to be included within the scope of the claims.

I claim:

1. Process which comprises reacting four atomic proportions of alkali metal dispersed in an inert organic solvent at a temperature above the melting point of the alkali metal with one molecular proportion of a neutral lower aliphatic monohydric alcohol ester of an open chain saturated dicarboxylic acid having a chain length, between and including the carboxyl carbons, of at least seven.

2. Process which comprises reacting an alkali metal, dispersed in an inert organic solvent at a temperature which is above the melting point of the metal and at which the solvent remains in the liquid state, with a neutral lower aliphatic monohydric alcohol ester of an open chain saturated dicarboxylic acid having a chain length, between and including the carboxyl carbons, of at least seven, said alkali metal at all times being present in sufficient quantity substantially to prevent a Claisen condensation.

3. Process which comprises reacting an alkali metal with a neutral monohydric alcohol ester of an open chain saturated dicarboxylic acid of chain length, between and including the carboxyl carbons, at least seven, in the presence of an inert organic solvent, said alkali metal at all times being present in sufficient quantity substantially to prevent a Claisen condensation.

4. Process which comprises reacting an alkali metal with a neutral monohydric alcohol ester of an open chain dicarboxylic acid of chain length, between and including the carboxyl carbons, at least seven, said alkali metal at all times being present in sufficient quantity substantially to prevent a Claisen condensation.

5. An acyloin of an open chain dicarboxylic acid having a chain length, between and including the carboxyl carbons, of at least seven.

6. An acyloin of a saturated open chain dicarboxylic acid having a chain length, between and including the carboxyl carbons, of at least seven.

7. A monomeric cyclic acyloin of a saturated open chain dicarboxylic acid having a chain length, between and including the carboxyl carbons, of at least seven.

8. A polymer acyloin of an open chain saturated dicarboxylic acid having a chain length, between and including the carboxyl carbons, of at least seven.

9. As a perfume ingredient, a monomeric cyclic acyloin of an open chain dicarboxylic acid having a chain length, between and including the carboxyl carbons, of at least seven.

10. A monomeric cyclic acyloin of an open chain dicarboxylic acid having a chain length between and inclusive of the carboxyl carbons, of from 14 to 18 inclusive.

11. A cyclic acyloin of sebacic acid having the formula $C_{10}H_{18}O_2$ and having the tautomeric structural formula

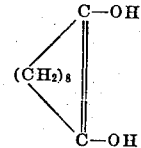

12. A cyclic acyloin of hexadecamethylene dicarboxylic acid having the formula $C_{18}H_{34}O_2$ and the tautomeric structural formula

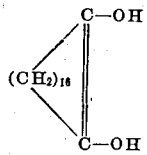

VIRGIL LELAND HANSLEY.